United States Patent [19]
Nicolas

[11] 3,872,299
[45] Mar. 18, 1975

[54] PROCESS AND DEVICE FOR DEFLECTION OF A RADIATION BEAM

[75] Inventor: Patrick Marie Nicolas, Le Chesnay, France

[73] Assignee: Republic of France, represented by the Minister of State for National Defense Delegation Ministerielle pour l'Armement, DPAG-Bureau des Brevets et Inventions, Paris, France

[22] Filed: Nov. 6, 1973

[21] Appl. No.: 413,364

[30] Foreign Application Priority Data
Nov. 30, 1972 France .................... 72.42520

[52] U.S. Cl. ............................ 250/203, 356/138
[51] Int. Cl. ............................ G01j 1/20
[58] Field of Search ............ 250/201, 202, 203, 204; 33/1 N, 1 PT; 356/138, 153; 350/285

[56] References Cited
UNITED STATES PATENTS

| | | | |
|---|---|---|---|
| 3,418,478 | 12/1968 | Falbel | 250/203 |
| 3,470,377 | 9/1969 | LeFebre | 250/204 |
| 3,508,832 | 4/1970 | Schroeder | 356/138 |
| 3,672,778 | 6/1972 | Kern | 356/138 |
| 3,720,454 | 3/1973 | Inderhees | 350/285 |

Primary Examiner—James W. Lawrence
Assistant Examiner—D. C. Nelms
Attorney, Agent, or Firm—Larson, Taylor and Hinds

[57] ABSTRACT

A process and device for deflection of a radiation beam comprising a deflector with two organs which move as a unit resulting in a deflection of the beam in rotation about a specific direction which may be the common axis of rotation of the two organs and wherein the movements in opposite directions at the same speed are expressed as an angular deflection toward or away from the direction thereof.

10 Claims, 5 Drawing Figures

PROCESS AND DEVICE FOR DEFLECTION OF A RADIATION BEAM

BACKGROUND OF THE INVENTION

The present invention relates to a process and a device for deflection of a radiation beam, comprising a deflector furnished with two organs whose movement as a unit results in a deflection of the beam in rotation about a specific direction which may be the common axis of rotation of the said organs, and whose movement in the opposite direction at the same speed is expressed by an angular deflection toward or away from the direction thereof.

The invention is applicable especially to the deflection of luminous beams, this latter term being interpreted here as designating visible radiation as well as infrared or ultraviolet radiation. It is not limited to this case, however, but may apply to the deflection of high frequency radiation, using either dielectric prisms or suitable antenna devices. The direction of the radiation beam that is led by the deflection organs into the predetermined direction defined above will be designated in the following discussion by the words "deflected path".

Devices are known for the deflection of optical beams which allow the training of the deflected path of the luminous entrance bundle into a spyglass or other optical system. These devices comprise two prisms, rotatable about a single axis constituting the predetermined direction, the edges of the said prisms being perpendicular to the axis. In this case, the rotation as a unit of the two prisms in the same direction turns the deflected path about the common axis. Reverse rotation of the two prisms causes angular displacement of the deflected path toward or away from the axis.

These devices have been used especially for permanent search sweeping. However, until now they have not been used for automatic angular tracking of a target or automatic display of a position because of certain difficulties including the fact that the position to be displayed or the position of the target is generally given in rectangular coordinates whereas the command parameters available or the angles of rotation of the two prisms do not allow, by simple combinations, anything other than angular displacement in rotation about the axis, or angular displacement toward or away from the axis.

SUMMARY OF THE INVENTION

The present invention is intended to furnish a process and a deflection device that will better satisfy practical requirements than do those presently known devices by providing display of a given target with a relatively simple means in rectangular coordinates.

For this purpose, the invention proposes a process for deflection of a radiation beam using two deflector organs whose displacement as a unit causes an angular displacement of the deflected beam in a predetermined direction, and whose displacement in the opposite direction and at the same speed causes displacement of the deflected beam toward the said direction or away from it, characterized in that the deflected path at a given instant is defined by its coordinates $\alpha_M$ and $\beta_M$ along two perpendicular directions, namely in site and gisement, and the reference path or target path being defined by its coordinates $\alpha_C$ and $\beta_C$ according to the said perpendicular directions, magnitudes $\alpha_C+\beta_C$, $\beta_C-\alpha_C$, $\alpha_M+\beta_M$ and $\beta_M-\alpha_M$ are determined, and the deflector organs are shifted, the first deflector in the positive direction when difference $(\alpha_C-\beta_C)-(\alpha_M+\beta_M)$ is positive, and in the negative direction when this difference is negative, and the second deflector in the positive direction when difference $(\beta_C-\alpha_C)-(\beta_M-\alpha_M)$ is positive, and in the negative direction when the difference is negative.

When the deflecting organs are constituted by organs rotatable about the same axis that coincides with the predetermined direction mentioned above, the coordinates of the deflected path of the moment are mostly not known directly. To determine the above differences, it is necessary to deduce them from parameters whose values are known, constituted by the angles of orientation of the deflector organs with reference to a predetermined direction. When in particular the deflector organs are constituted by prisms rotatable about a common axis comprising the predetermined direction, it is possible to determine coordinates $\alpha_M$ and $\beta_M$ defining the deflected direction of the moment of the orientation angles of the prisms with reference to two directions that are at 45° from the perpendicular axes with reference to which the reference deflected path is defined.

The invention likewise includes a deflection device that allows execution of the above defined procedure, comprising two deflector organs whose movement as a unit causes a displacement of the deflected path about the predetermined direction, and whose movement in the opposite direction away from each other causes a shift of the deflected beam toward the said predetermined direction or away from it, characterized in that it comprises means for determination of the sign of the expressions $(\alpha_C-\beta_C)-(\alpha_M+\beta_M)$ and $(\beta_C-\alpha_C)-(\beta_M-\alpha_M)$ and drive means to command movement of the first organ in a direction that corresponds to the sign of the first expression and movements of the second drive organ in a direction that depends upon the sign of the second expression.

The invention further includes a device of the above defined type in which the deflector organs are constituted by two refringent prisms mounted in two coaxial rings, each ring bearing the annular rotor of a hollow drive that turns in a stator, borne by a casing that contains the prisms, each ring constituting the movable organ of a pickup that furnishes an output voltage that varies as a function of the sine and cosine of its orientation starting from a predetermined direction.

BRIEF DESCRIPTION OF THE DRAWINGS

The invention will be better understood upon reading the following detailed description of a preferred embodiments of the invention by way of example, taken together with the accompanying drawings, in which.

DETAILED DESCRIPTION OF THE PREFERRED EMBODIMENTS

The device to be described below is intended to bring the deflected path of an optical bundle into a reference orientation defined by its coordinates along two rectangular axes, which are in general coordinates of site and gisement, respectively designated $\alpha_C$ and $\beta_C$. The device utilizes, as deflecting organs, prisms mounted in a mechanical assembly, the detailed description of which will be given below. As an example, such a device may be used as a firing control facility for a gun. The deflecting device receives data furnished by a computer and brings the deflected path, with reference to the axis of a field glass of the device, into an orientation such that the gun to which the said glass is fixed is correctly aimed when the target appears on the intersection of the reticle lines of the glass.

Figure 1:
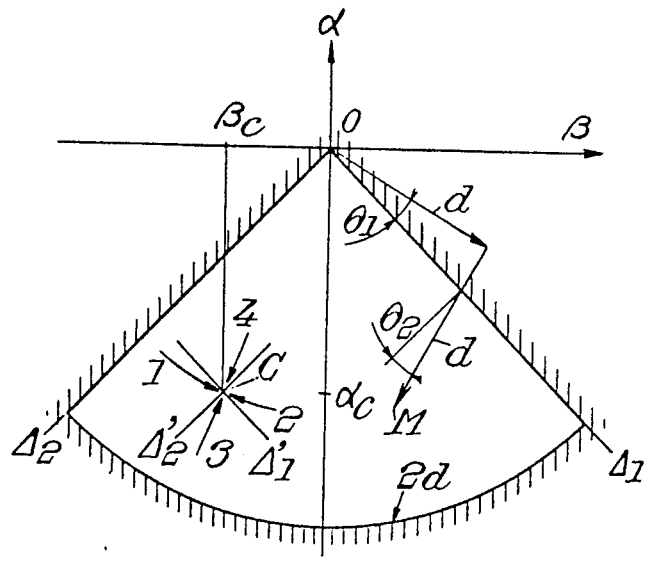
FIG. 1 is a diagram showing the coordinates that allow definition of the deflected path of the moment and the reference deflected path, as well as various pathways allowing passage from one to the other.

When coordinates $\alpha_C$ and $\beta_C$ are given, it is necessary to move the prisms in a direction such that there is passage from an initial deflected path, defined by point M of coordinates $\alpha_M$ and $\beta_M$ in FIG. 1, to reference point C which is defined by coordinates $\alpha_C$ and $\beta_C$. It would be possible to develop a device that would allow this result no matter what the respective positions of M and C within the limit fixed by the deflecting capabilities of the device, which is to say in the whole domain such that:

$$\alpha_2 + \beta_2 \leq 4d^2$$

in which $d$ is the nominal deflection furnished by each of the prisms, which deflection will be assumed to be the same for the sake of simplicity although in practice there would always be a slight difference.

In fact, the device that is now to be described is only intended to effect deflected paths that meet the two following supplementary conditions:
$$\alpha + \beta \leq 0$$
$$\alpha - \beta \leq 0$$

These two supplementary conditions mean simply that the limitation is accepted whereby the deflected path will be in the domain defined in FIG. 1 by a circle with radius $2d$ and the straight lines $$\Delta 1 \text{ and } \Delta 2$$

at 45° with references to axes $0\alpha$ and $0\beta$ (domain surrounded by hatchings in the figure).

Moreover, the interest in covering the four quadrants is more apparent than real because point 0 cannot be attained since the standard deflection is never absolutely the same for the two prisms.

Incidentally it must be noted that this limitation which allows an enormous simplification of the electronic system of the device, constitutes no source of trouble in most cases, especially in fire direction facilities where the tube and hence the glass are always directed above the actual target. Moreover, it is always possible to add a prism upstream for vertical deflection.

If there is the further restriction of causing both of the prisms to turn at the same speed in one or the other of the possible directions (for each), there are four possible routes to arrive at point C. These four routes are two circular routes about point 0 of intersection of axes $\alpha$ and $\beta$, numbered 1 and 2, and two radial routes toward 0 and from 0, numbered 3 and 4. There is the problem of making a simple determination of which routes are to be selected to bring the deflected path of the moment toward the reference deflected path, until they meet.

According to the invention, to bring the deflected path to C, one or another of these four routes is selected, depending on whether we are in one or another of the four quadrants defined by $\Delta_1'$ and $\Delta_2'$ passing through C and parallel to $\Delta_1$ and $\Delta_2$. As seen in FIG. 1 there will always be an approach to C from any possible point in the domain, assigning to each of the quadrants the routes indicated in FIG. 1.

In other words, the route to get from the deflected path of the moment to the reference deflected path will be selected according to the quadrant defined by $\Delta'_1$ and $\Delta'_2$ in which M is located. If M is in quadrant 2 for example, the two prisms will be turned as a unit in a direction which will be the trigonometric direction, considered below to be positive. If M is in quadrant 1, the prisms would be turned in the negative direction, as a unit.

It is to be observed that when the point representing the deflected path of the moment passes from one side to the other of one of the straight lines $\Delta'_1$ and $\Delta'_2$ the direction of rotation of one of the prisms has to be reversed. It might appear that at the moment in which point M is on one of these straight lines the control would stop acting and the system would become inoperative. In fact, when the mechanical load is moving and point M reaches one of the straight lines, inertia causes it to go past, immediately activating the control. If in the initial state it happens that M is on one of the straight lines, the vibrations that always exist in practice take it to one or the other side of the straight line.

If the orientations of the two deflector prisms are designated by $\theta 1$ and $\theta 2$, counted respectively from $\Delta_1$ and $\Delta_2$ and if the rates of variation of these angles are designated by $\theta'_1$ and $\theta'_2$ (which will intervene subsequently only by their sign), the control device must command the prism drives in a direction given by the sign of $\theta'_1$ and $\theta'_2$ to pass from M to C by the routes described above.

The invention furnishes a way of simple determination of the sign of $\theta'_1$ and $\theta'_2$ from coordinates $\alpha_C$ and $\beta_C$ of the reference deflected path and $\alpha_M$ and $\beta_M$ of the deflected path of the moment, at any given instant. Examination of FIG. 1 reveals that the following table can be set up showing that the sign of $\theta'_1$ and $\theta'_2$ is the same as that of expressions readily computed by means of electronic circuits for treatment of parameters $\alpha_C$, $\beta_C$, $\alpha_M$ and $\beta_M$:

| Movement along | 1 | 2 | 3 | 4 |
|---|---|---|---|---|
| $(\alpha + \beta)_C - (\alpha + \beta)_M$ | + | − | + | − |
| $(\beta - \alpha)_C - (\beta - \alpha)_M$ | + | − | − | + |
| $\theta'_1$ | + | − | + | − |
| $\theta'_2$ | + | − | − | + |

The above table shows that the sign of $\theta'_1$ is the same as that of the first expression whereas the sign of $\theta'_2$ is the same as that of the second expression in all possible cases. Consequently it will suffice that the control circuit cause the prisms to turn in a fixed direction for the first, by the sign of the first expression, and for the second by the sign of the second expression, until the two expressions reach a value of zero.

The coordinates $\alpha_M$ and $\beta_M$ of point M are not known directly, in contrast to the coordinates of reference point C. But they may be calculated from deflection d given by each of the prisms and from angles $\theta_1$ and $\theta_2$ of prism orientation with reference to straight lines $\Delta_1$ and $\Delta_2$ by the equations:

$$\alpha_M + \beta_M = \sqrt{2}(d_1 \sine \theta_1 - d_2 \cos \theta_2)$$
$$\beta_M - \alpha_M = \sqrt{2}(d_1 \cos \theta_1 + d_2 \sine \theta_2)$$

Figure 2:
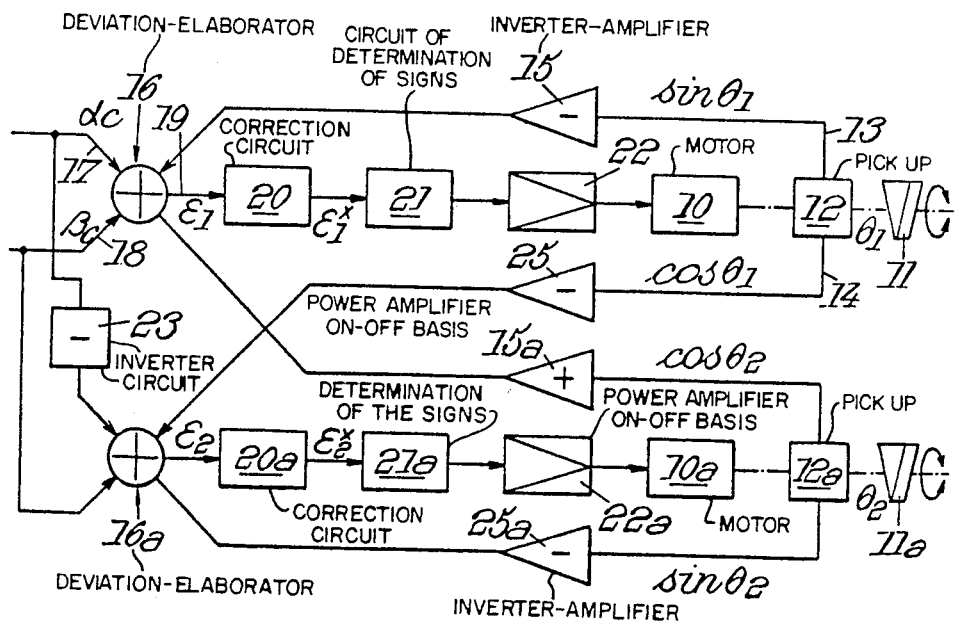
FIG. 2 is a schematic diagram showing the electronic system of the command device.

FIG. 2 presents a block diagram of the electronic circuit which allows command of the prisms in the appropriate direction, with elaboration of the various expressions mentioned above.

The device may be considered to comprise two discrete, coupled command systems within the same general arrangement. Consequently only the system for command of the first prism will be described in detail.

The control system of first prism 11, whose rotation is controlled by a motor 10, comprises a pickup 12 that furnishes, on a first output 13, a signal whose amplitude is in proportion to sine $\theta_1$ and on a second output 14, a signal whose amplitude is in proportion to cos $\theta_1$. The signal representing sine $\theta_1$ is applied to an inverter amplifier 15, with gain equal to $d_1 \sqrt{2}$. The amplified signal is applied to a deviation elaborator 16 which can be constituted by a linear summing circuit. In practice, the deviation elaborating device will be constituted by an operational amplifier whose input receives, via resistors, the various signals representing magnitudes that are to be summed.

Deviation elaborating or summing device 16 receives, on inputs 17 and 18, signals representing $\alpha_C$ and $\beta_C$. Finally, on a last input, it receives a signal coming from detector 12a associated with second prism 11a. This signal, representing cosine $\theta_2$, is amplified without inversion by an amplifier 15a with gain $d_2 \sqrt{2}$ before application to the summing device 16.

It is seen that summing 16 thus furnishes on its output 19 a signal $\epsilon_1$ equal to $$\epsilon_1 = (\alpha_C + \beta_C) - \sqrt{2}(d_1 \sine \theta_1 - d_2 \cos \theta_2)$$

The sign of this signal $\epsilon_1$ represents the direction in which it is necessary to drive first prism 11, i.e. the sign of $\theta'_1$ or the polarity of the command voltage to be applied to reversible motor 10.

The avoid instabilities of the control loop, signal $\epsilon_1$, is only applied to the motor by means of an electric correction circuit 20. This circuit is in general constituted by an operational amplifier mounted as a differentiator integrator that furnishes a phase advance much greater than the 20°–30° which is considered to be standard in linear circuits, and may reach 55°. The pass band for this circuit will be selected so that it corresponds to the instability frequencies which might occur.

Output signal $\epsilon_1$ of phase advance circuit 20 is applied to a circuit 21 for determination of the sign that furnishes, at its output, a square wave whose polarity is that of the sign of $\epsilon_1$, but of constant value. This output signal is the command signal for a power amplifier functioning on an all-or-nothing basis that supplies motor 10. This motor drives a charge constituted by prism 11 and detector 12 which gives, at its output 13, a signal that is in proportion in amplitude to sine $\theta_1$.

The control system associated with prism 11a has the same arrangement as the former system, and the elements of this system that correspond to those of the first are referenced with the same numeral and an added subscript a. However, summing device 16a receives signals that differ from those applied to the summing device 16. The signal representing reference coordinate $\alpha_C$ is applied via an inverter circuit 23. The signals applied to the adders 16 and 16a, representing the orientation of the prisms, come respectively from the output of detector 12 that furnishes cos $\theta_1$ and the output of detector 12a which furnishes cos $\theta_2$. Two inverter-amplifiers 25 and 25a respectively multiply the output of the detectors respectively by $-d_1 \sqrt{2}$ and $d_2 \sqrt{2}$. Output signal $\epsilon_2$ of summing device 16a goes to a phase advance circuit 20a, followed by a sign detector 21a and an all-or-nothing amplifier 22a that supplies reversible motor 10a.

Figure 3:
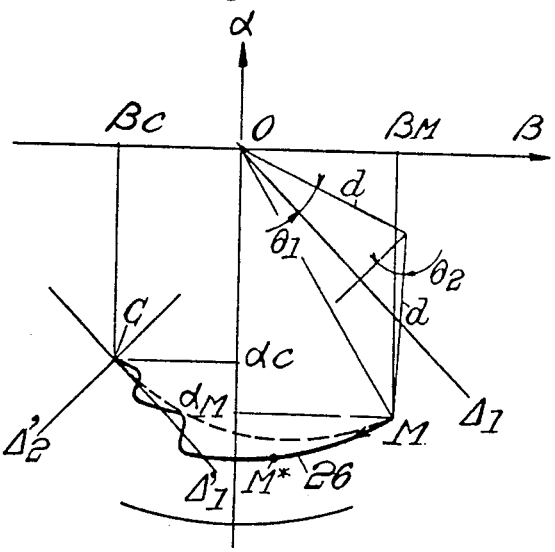
FIG. 3 is a diagram illustrating schematically a possible pathway for passage of an initial deflected path to a reference deflected path.

By way of example, there is explained below the process of passage from an initial situation in which the deflected beam corresponds to point M of FIG. 3 to a reference position corresponding to point C of FIG. 3.

Since point M is in quadrant 2, the summing devices furnish signals $\epsilon^*_1$ and $\epsilon^*_2$ which are both positive. Motors 10 and 10a cause prisms 11 and 11a to turn in the trigonometric direction, at the same rate, which is expressed, for point M* whose coordinates are $\epsilon^*_1$ and $\epsilon^*_2$ in axes $\Delta'_1$ and $\Delta'_2$ by an arcuate route 26 to the point at which the arc intersects $\Delta'_1$. As soon as this representative point goes beyond $\Delta'_1$, the direction of $\epsilon^*_1$ is reversed. The direction of rotation of motor 10 also reverses, but with a delay due to the inertia of the mechanical pieces. After a zone of adjustment, the route followed by M* becomes radial with reference to the coordinates center 0. As soon as this route again crosses $\Delta'_1$ the sign of $\epsilon_1$ changes, motor 10 is braked once again and then starts off in the opposite direction and so on. The route of passage from M to C thus has the general characteristic that is indicated by dashes in FIG. 3. Because of the considerable gain of the control systems, this path is close to the direct path from M to C.

Figure 4:
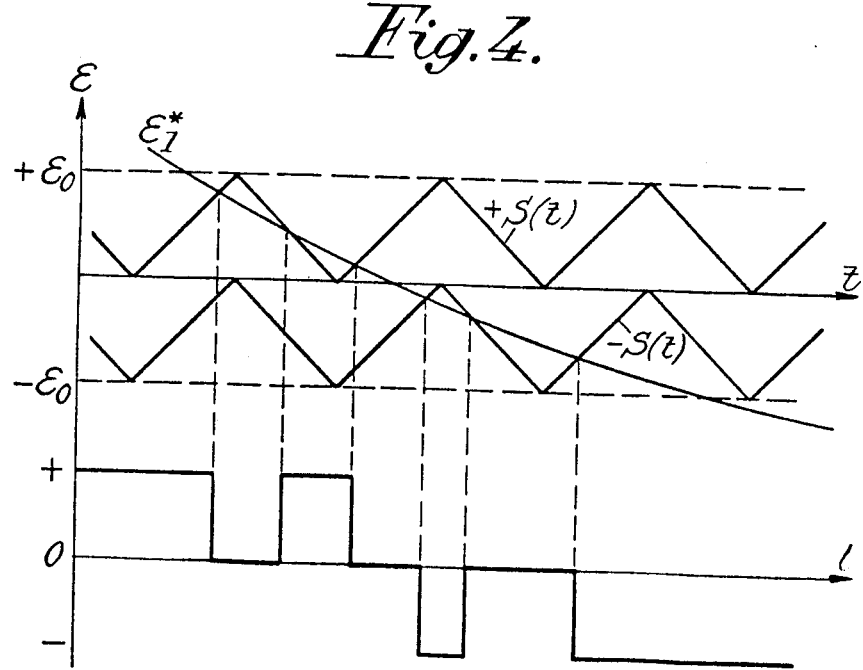
FIG. 4 is a diagram showing the principle of a method of command which is a variant of the one developed in the device of FIG. 2, which permits avoiding oscillations about the reference deflected path.

As described thus far, the control system could cause oscillations of low amplitude on the part of the prisms, causing the actual deflected path to oscillate about the reference path. Though the amplitude is low, these oscillations can be troublesome because they make a fuzzy outline for the observer, and fatigue the mechanical pieces, all the more so since their frequency is generally high, of the order of 100 Hz. Consequently, according to a preferred embodiment of the invention, means are provided to eliminate oscillations about the reference point. A first solution consists in mounting on the output of summing devices 16 and 16a threshold amplifiers whose output is zero so long as an input signal does not reach a specific value. Another solution which makes it possible not to sacrifice precision consists in superposing on the all-or-nothing functioning (especially for large amplitudes of movement) a pseudo linear command based on a comparison of the corrected error signals $\epsilon^*_1$ and $\epsilon^*_2$ furnished by phase advance circuits 20 and 20a with two sawtooth voltage signals with a period of recurrence greater than the electric time constant of motors 10 and 10a but less than the auto-oscillation period mentioned above (100 Hz for example). On the first system, for example, the corrected error signal $\epsilon^*_1$ is compared with two signals S(t) and —S(t) which present a sawtooth variation as indicated in FIG. 4. If $\epsilon_1$ is greater than crest value $\epsilon_0$ of the sawtooth, the command has no indentations, i.e. it is effected by more or less. If on the contrary $\epsilon^*_1$ is less than $\epsilon_0$, the command is constituted by current pulses whose duration is in proportion to $\epsilon^*_1/\epsilon_0$. To attain this result, it suffices to use a generator assembly for two sawtooth voltages that fix the points of swinging of the comparator. The latter is then in fact constituted by two asymmetrical comparators. The pulses, in the schematic illustration on the upper line of FIG. 4 have the duration and distribution indicated by the hatchings on the lower line of FIG. 4.

Figure 5:
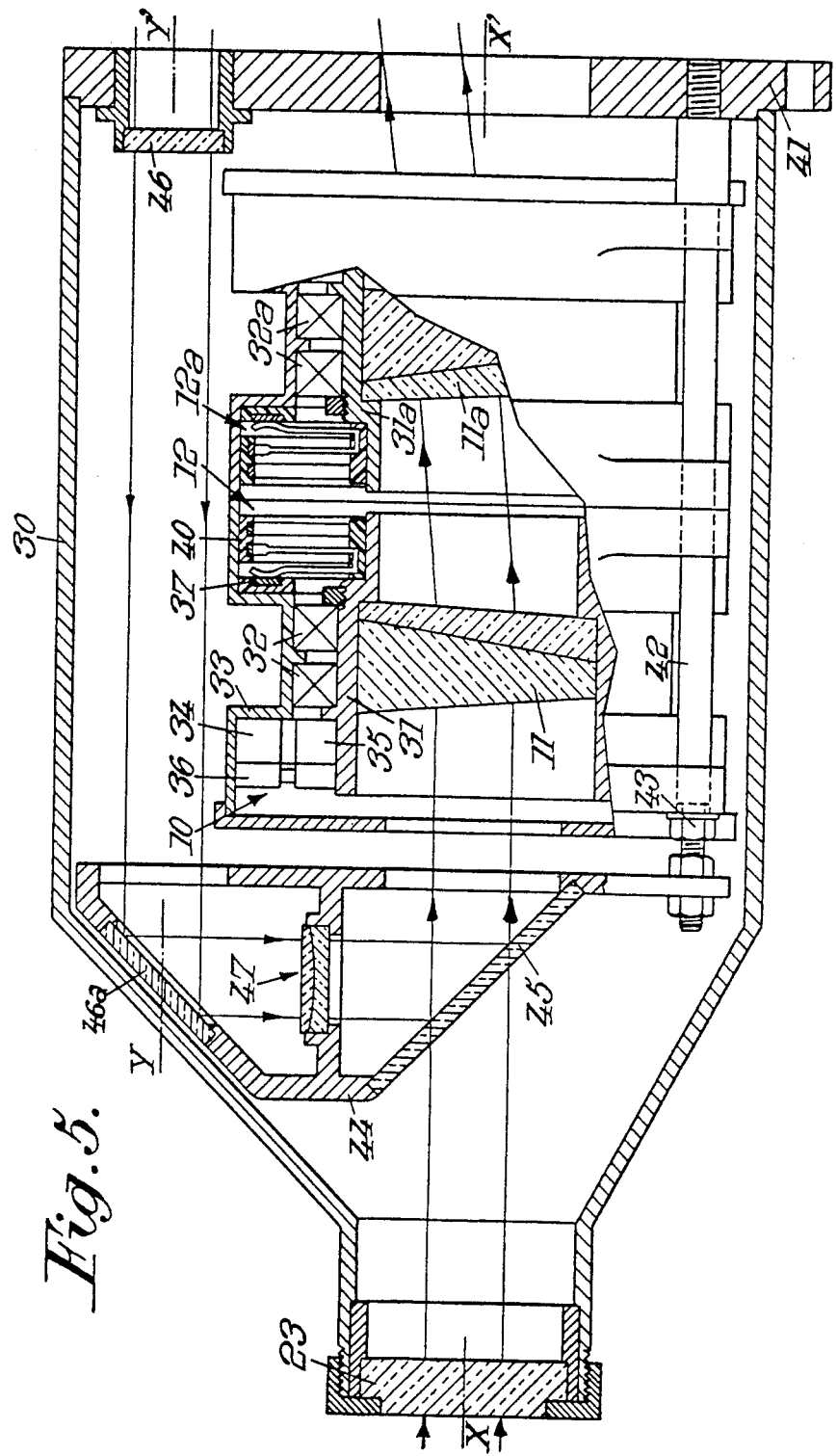
FIG. 5 shows the optical and mechanical parts of the device, in section along a plane passing through the optical axis.

The control device that has just been described in adaptable to the deflection device illustrated in FIG. 5.

The optical deflector device illustrated in FIG. 5 comprises two prisms constituting deflector organs 11 and 11a of FIG. 2. These prisms 11 and 11a are mounted inside a common fixed casing 30 and they are interposed in series on an entering light beam arriving from the right in FIG. 5. These prisms are arranged to bring a luminous beam arriving from the right of the figure into axis XX' of the deflector, fixed for example on a glass placed at the left, along a deflected path. Prisms 11 and 11a are symmetrical with reference to the diametric plane that separates them. Each prism, 11 for example, has the form of a cylinder section with axis XX', truncated by the plane terminal faces that converge toward an edge perpendicular to axis XX' and are inclined on the said axis. Each prism is advantageously composite so as to be achromatic. When the deflector is intended to function in visible light and in infrared, there may be associated, for example, a flint element and a crown element, selected so that the achromatism will be in the visible at 0.43, and close in the infrared.

Prisms 11 and 11a are mounted so as to be rotatable about axis XX'. Each prism 11 or 11a is mounted in a ring 31 or 31a of generally cylindrical form. Each ring is rotatably mounted about axis XX' by prestressed bearings 32 and 32a whose outer rings are locked in frame 33.

The motors provided for driving the rings and the prisms in rotation are hollow motors placed around the rings. The said motors are identical. Motor 10 for example comprises a stator 34 fitted into frame 33 and a rotor 35 fixed on ring 31. The stator can be constituted by stacked magnets, connected by a magnetic shunt. An annulus 36 is fixed to it which presents brushes that are in frictional contact with rotor 35. Brush holder 36 has supply leads issuing from the casing (not shown).

The angular positions of rings 31 and 31a are indicated by detectors 12 and 12a. Each of these detectors furnish a signal representing the sine of the angle of orientation with reference to a specific direction of origin and a signal that represents the cosine of this angle. The two detectors are identical but their fixed parts are shifted by 90° so as to correspond to $\Delta_1$ and $\Delta_2$ of FIG. 1.

The detectors can be constituted by functional potentiometric devices with plastic conductive tracks, like those manufactured by MCB company at Courbevoie, France. Detector 12 for example comprises a ring 37 with a track whose resistivity measured from a specific point varies according to sine $\theta$. This ring is fixed on frame 33. The movable part of detector 12 has two slides fixed at 90° with reference to each other on an insulating ring 38. Slide 39, the only one visible in FIG. 5, has a first friction element that is applied to the track of ring 37 and a second friction element that is applied on a conductive ring borne by an insulating ring 40. The two slides are set at 90° to furnish respectively the sine and the cosine. The conductive rings borne by insulating ring 40 are connected to the control system illustrated in FIG. 2 by fixed conductors that are not shown.

Frame 33 is fixed on cover 41 of casing 30 by threaded rods 42 and bolts 43. Threaded rods 42 likewise hold a support 44 in which there is mounted a semi transparent sheet 45. This allows juxtaposition of the image furnished by the light beam entering along the deflected path and the image of a reference scale. The image of this scale, illuminated by light beams entering the device through a window 46 along axis YY' and reflected at 46a, is projected to infinity by an optical device 47. The image of the graduated scale returned by sheet 45 undergoes the same deviation as the field and, no matter what the deflected path, allows definition of the position of a point with reference to the center of the observed field.

The invention can obviously have many modifications and variations apparent to those skilled in the art without departing from the spirit or scope of the invention. For example, the control systems can furnish to the motor a voltage that varies as an increasing function of the separation between the deflected path of the moment and the reference deflected path. However, this solution is not very advantageous because it results in a slowing of the correction. Finally, the nominal deviation of the two deflection organs is not necessarily the same.

I claim:

1. A process for deflection of a radiation beam allowing the bringing of the deflected path of the beam into a reference direction defined by its coordinates $\alpha_C$ and $\beta_C$ along two perpendicular directions, using two beam deflector members which move as a unit causing an angular displacement of the deflected beam about a predetermined direction perpendicular to the directions of the coordinates and whose displacement in the reverse direction and at the same speed causes a displacement of the deflected beam about the said predetermined direction or from the said predetermined direction, comprising the steps of: determining the deflected path at a given moment as defined by its coordinates $\alpha_M$ and $\beta_M$ along the said directions of coordinates, determining the sign of a first magnitude $\alpha_C+\beta_C-(\alpha_M+\beta_M)$ and of a second magnitude $(\beta_C-\alpha_C)-(\beta_M-\alpha_M)$, moving a first deflector organ in a first direction when the first magnitude is positive and in the opposite direction when the said first magnitude is negative, and moving a second deflector organ in the said first direction when the said first magnitude is positive and in the opposite direction when the said second magnitude is negative.

2. Process as in claim 1, characterized in that the first and the second beam deflector members comprise respective refringent prisms mounted to rotate about a common shaft, with their edges perpendicular to the said shaft, and wherein magnitudes $\alpha_M+\beta_M$ and $\beta_M-\alpha_M$ are deduced from the orientation of the said prisms referring to two directions at 45° from the directions of the coordinates.

3. In a device for deflection of a radiation beam which allows the bringing of the deflected path of the beam into a reference direction defined by its coordinates $\alpha_C$ and $\beta_C$ along two perpendicular directions, namely in site and gisement, and having two beam deflector members whose movement as a unit causes an angular displacement of the deflected beam about a predetermined direction perpendicular to the directions of the coordinates and who displacement in the reverse direction and at the same speed causes a displacement of the deflected beam about the said predetermined direction or away from the said predetermined direction, the improvement including means for determinating of sign of a first magnitude $\alpha_C+\beta_C-(\alpha_M+\beta_M)$ and of a second magnitude $(\beta_C-\alpha_C)-(\beta_M-\alpha_M)$, wherein $\alpha_M$ and $\beta_M$ are the coordinates of the deflected path at a given moment along the said perpendicular direction, and control means for moving the first beam deflector member in a first direction when the first magnitude is positive and in the opposite direction when the said first magnitude is negative, and for displacing the second beam deflector member in the first direction when the second magnitude is positive and in the opposite direction when the said second magnitude is negative.

4. A device as in claim 3, including means for deducing magnitudes $\alpha_M+\beta_M$ and $\beta_M-\alpha_M$ of the orientation of the two beam deflector members about a common axis of rotation, with reference to two orthogonal directions, said means being used for determinating the sign of the magnitudes in cooperation with the said means used for.

5. A device as in claim 3, wherein the said control means comprise two motors respectively coupled to one of the beam deflector members and responsive on an on-off basis depending upon the sign of the two corresponding magnitudes.

6. A device as in claim 5, including supplementary control means for applying to the said motors current pulses during a duration that is in proportion to the amplitude of the corresponding magnitude, with fixed frequency, when the amplitude of the said magnitude is less than a predetermined value.

7. A device as in claim 3, wherein the beam deflector members are constituted by two prisms with the same nominal deviation, rotatably mounted about a single shaft perpendicular to their edges, and coinciding with the predetermined direction perpendicular to the directions of the coordinates.

8. A device for deflection of a radiation beam, comprising two refringent prisms mounted respectively in two rings placed one behind the other on the same shaft about which they are rotatably mounted, the two prisms having respectively their edges perpendicular to the said axis of rotation, two annular motors, each operatively connected to a prism to turn the corresponding ring, comprising, for each prisms, a detector which includes means for furnishing two signals whose amplitude is in proportion to the sine and cosine of the angle of orientation of the prisms with reference to a specific direction or origin perpendicular to the said shaft, and circuit means for deducing from the said signals furnished by the detectors the direction of the deflected beam in rectangular coordinates with respect to the axes at 45° from the direction of origin.

9. A device as in claim 8, including control means responsive to the said circuits, for supplying signals to the said motors only simultaneously on a on-off basis the polarity of one said signals making the motors turn in the same direction, and the polarity of the other causing them to turn in opposed directions.

10. A device as in claim 8, said circuit means being provided for bringing of the deflected path into a single one of the four quadrants limited by the direction of origin and the direction that is orthogonal thereto, no matter what the direction of the deflected path in said selected quadrant.

* * * * *